US009695708B2

(12) United States Patent
Hettinger et al.

(10) Patent No.: US 9,695,708 B2
(45) Date of Patent: Jul. 4, 2017

(54) TURBOCHARGER SPRING ASSEMBLY

(71) Applicant: Honeywell International Inc., Morristown, NJ (US)

(72) Inventors: Raphaël Hettinger, La Baffe (FR); Raphaël Boileau, Thaon les Vosges (FR); Fréderic Daguin, Epinal (FR); José Antonio Molina, Vitoria-Gasteiz (ES); Tomás Moriñigo, Vitoria (ES)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/684,394

(22) Filed: Apr. 12, 2015

(65) Prior Publication Data

US 2016/0298490 A1 Oct. 13, 2016

(51) Int. Cl.
*F16C 19/06* (2006.01)
*F16C 27/04* (2006.01)
(Continued)

(52) U.S. Cl.
CPC .............. *F01D 25/164* (2013.01); *F02C 6/12* (2013.01); *F02C 7/06* (2013.01); *F16C 19/548* (2013.01);
(Continued)

(58) Field of Classification Search
CPC .......... F16C 19/00; F16C 19/54; F16C 25/08; F16C 27/04; F16C 27/026; F16C 35/07;
(Continued)

(56) References Cited

U.S. PATENT DOCUMENTS 1,448,189 A * 3/1923 Brunner ............... F16C 19/54
　　　　　　　　　　　　　　　　　　　384/611
2,973,136 A * 2/1961 Greenwald ........... F01D 25/16
　　　　　　　　　　　　　　　　　　　277/348
(Continued)

FOREIGN PATENT DOCUMENTS

CN　　　201771556 U　　3/2011
EP　　　　2530254 A2　　12/2012
(Continued)

OTHER PUBLICATIONS

PCT International Search Report / Written Opinion, PCT/US2014/041001, Oct. 7, 2014 (11 pages).
(Continued)

*Primary Examiner* — Marcus Charles
(74) *Attorney, Agent, or Firm* — Brian J. Pangrle

(57) ABSTRACT

A turbocharger bearing assembly can include a spacer that includes an axial through bore, a compressor side surface and a turbine side surface; a compressor side rolling element bearing that includes an outer race surface that faces the compressor side surface of the spacer; a turbine side rolling element bearing that includes an outer race surface that faces the turbine side surface of the spacer; and a spring seated between a first end cap disposed at least in part in the axial through bore of the spacer and a second end cap disposed at least in part in the axial through bore of the spacer where the spring biases an axially facing surface of the first end cap against the outer race surface of the compressor side rolling element bearing and where the spring biases an axially facing surface of the second end cap against the outer race surface of the turbine side rolling element bearing.

16 Claims, 15 Drawing Sheets

(51) Int. Cl.
*F16C 19/54* (2006.01)
*F16C 33/66* (2006.01)
*F01D 25/16* (2006.01)
*F02C 6/12* (2006.01)
*F02C 7/06* (2006.01)
*F16C 25/08* (2006.01)
*F16C 19/16* (2006.01)

(52) U.S. Cl.
CPC ........ *F16C 25/083* (2013.01); *F16C 33/6659* (2013.01); *F05D 2220/40* (2013.01); *F05D 2240/54* (2013.01); *F05D 2260/602* (2013.01); *F05D 2300/43* (2013.01); *F16C 19/163* (2013.01)

(58) Field of Classification Search
CPC .... F16C 33/66; F16C 27/066; F16C 33/6659; F16C 2360/24; F01D 25/16; F01D 25/162
USPC ....... 384/462, 513, 517, 535, 538, 551, 504, 384/515, 518–520; 415/142, 170.1, 229; 417/407, 423.12
See application file for complete search history.

(56) References Cited

U.S. PATENT DOCUMENTS

| | | | |
|---|---|---|---|
| 2,991,926 A * | 7/1961 | Diefenderfer | F01D 25/16 415/180 |
| 3,017,230 A | 1/1962 | Meermans | |
| 3,637,271 A | 1/1972 | Bayard | |
| 4,285,632 A | 8/1981 | DeSalve | |
| 4,523,899 A * | 6/1985 | Ouchi | F04D 29/126 415/174.3 |
| 4,565,505 A | 1/1986 | Woollenweber | |
| 4,652,219 A * | 3/1987 | McEachern, Jr. | F01D 25/16 384/518 |
| 4,721,441 A | 1/1988 | Miyashita et al. | |
| 4,808,091 A * | 2/1989 | Ruetz | F01D 25/16 384/556 |
| 4,943,170 A | 7/1990 | Aida | |
| 4,983,050 A | 1/1991 | Aida | |
| 4,997,290 A | 3/1991 | Aida | |
| 5,522,667 A | 6/1996 | Miyake | |
| 5,622,358 A | 4/1997 | Komura | |
| 5,639,074 A | 6/1997 | Greenhill et al. | |
| 6,971,801 B2 | 12/2005 | Miyazaki et al. | |
| 7,214,037 B2 | 5/2007 | Mavrosakis | |
| 8,794,917 B2 * | 8/2014 | Boning | F16C 27/066 415/229 |
| 8,858,173 B2 * | 10/2014 | Marsal | F04D 29/059 415/229 |
| 8,985,857 B2 | 3/2015 | Schmidt et al. | |
| 2007/0036477 A1 | 2/2007 | McKeirnan, Jr. | |
| 2007/0154126 A1 | 7/2007 | Ito | |
| 2007/0183704 A1 | 8/2007 | Umekawa | |
| 2007/0280824 A1 | 12/2007 | Ward | |
| 2008/0019629 A1 | 1/2008 | McKeirnan | |
| 2009/0202343 A1 | 8/2009 | McKeirnan | |
| 2010/0104233 A1 * | 4/2010 | Bando | F01D 25/16 384/490 |
| 2011/0200422 A1 | 8/2011 | Gutknecht | |
| 2011/0274379 A1 | 11/2011 | Fiedler et al. | |
| 2012/0282078 A1 | 11/2012 | Marsal et al. | |
| 2013/0294948 A1 | 11/2013 | Schumnig | |
| 2014/0119898 A1 | 5/2014 | Nishida | |
| 2014/0369865 A1 * | 12/2014 | Marsal | F01D 25/16 417/406 |

FOREIGN PATENT DOCUMENTS

| | | | |
|---|---|---|---|
| JP | H06-001737 U | | 1/1994 |
| JP | 2002129967 A | | 5/2002 |
| JP | 2002129968 A | | 5/2002 |
| JP | 2002129969 A | | 5/2002 |
| JP | 2002242937 A | | 8/2002 |
| JP | 2005171796 A | | 6/2005 |
| JP | 2005172099 A | | 6/2005 |
| JP | 2006090402 A | | 4/2006 |
| JP | 2009204004 | | 9/2009 |
| JP | 2009-293614 A | | 12/2009 |
| JP | 2010151293 A | * | 7/2010 |
| WO | 0206649 A1 | | 1/2002 |
| WO | 2005057032 A1 | | 6/2005 |
| WO | 2005073575 A1 | | 8/2005 |
| WO | 2014014791 A1 | | 1/2014 |

OTHER PUBLICATIONS

PCT/US2016/026880 International Search Report, Jul. 19, 2016 (4 pages).
PCT/US2016/026880 Written Opinion, Jul. 19, 2016 (9 pages).
PCT/US2016/026872 International Search Report, Jul. 22, 2016 (4 pages).
PCT/US2016/026872 Written Opinion, Jul. 19, 2016 (10 pages).
EP Application No. 16 163 758.2, Examination Report & Search Report, Aug. 23, 2016 (6 pages).

* cited by examiner

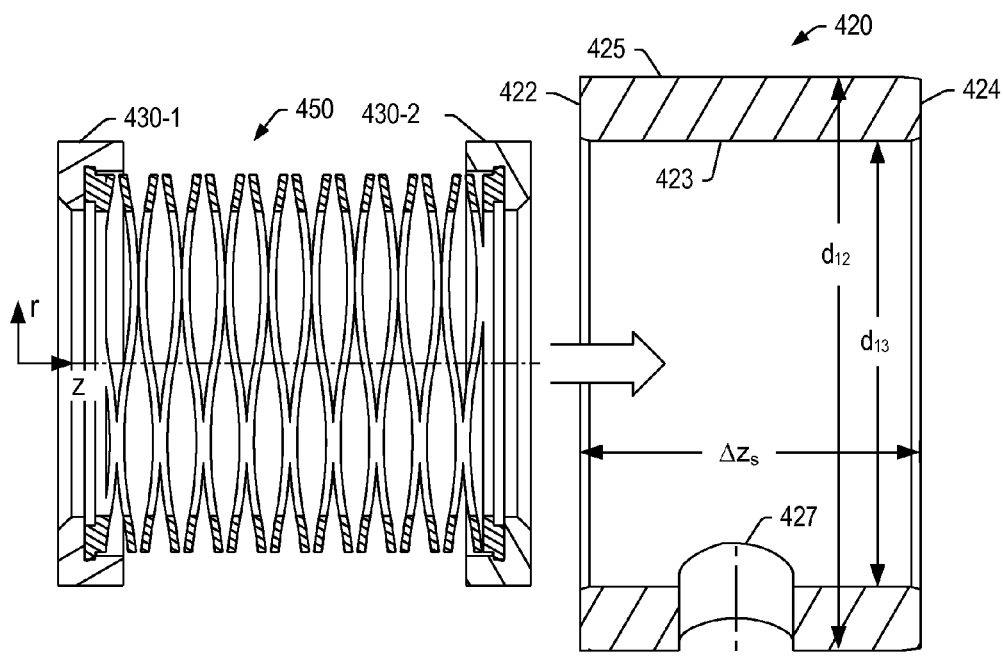
Fig. 11A
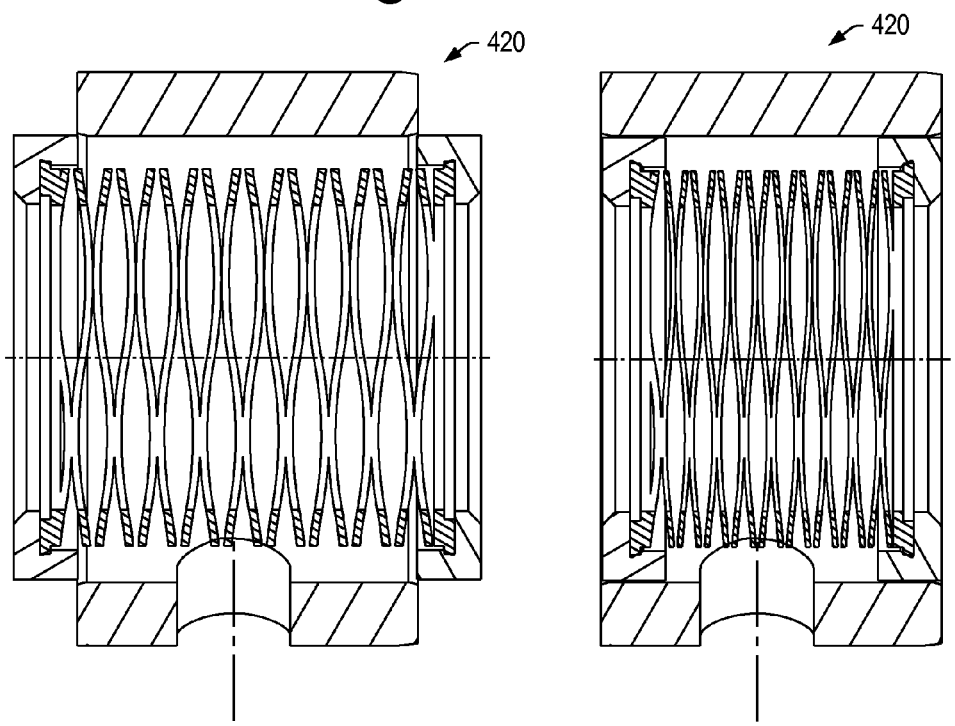
Fig. 11B
Fig. 11C

TURBOCHARGER SPRING ASSEMBLY

TECHNICAL FIELD

Subject matter disclosed herein relates generally to turbochargers.

BACKGROUND

A turbocharger can increase output of an internal combustion engine. A turbocharger can include an exhaust turbine assembly that can receive exhaust gas from cylinders of an internal combustion engine. Exhaust may be directed to a turbine wheel such that energy may be extracted, for example, to drive a compressor wheel of a compressor assembly.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIGS. 11A, 11B and 11C show views of an example of a spring and spacer assembly;

DETAILED DESCRIPTION

Figure 1:
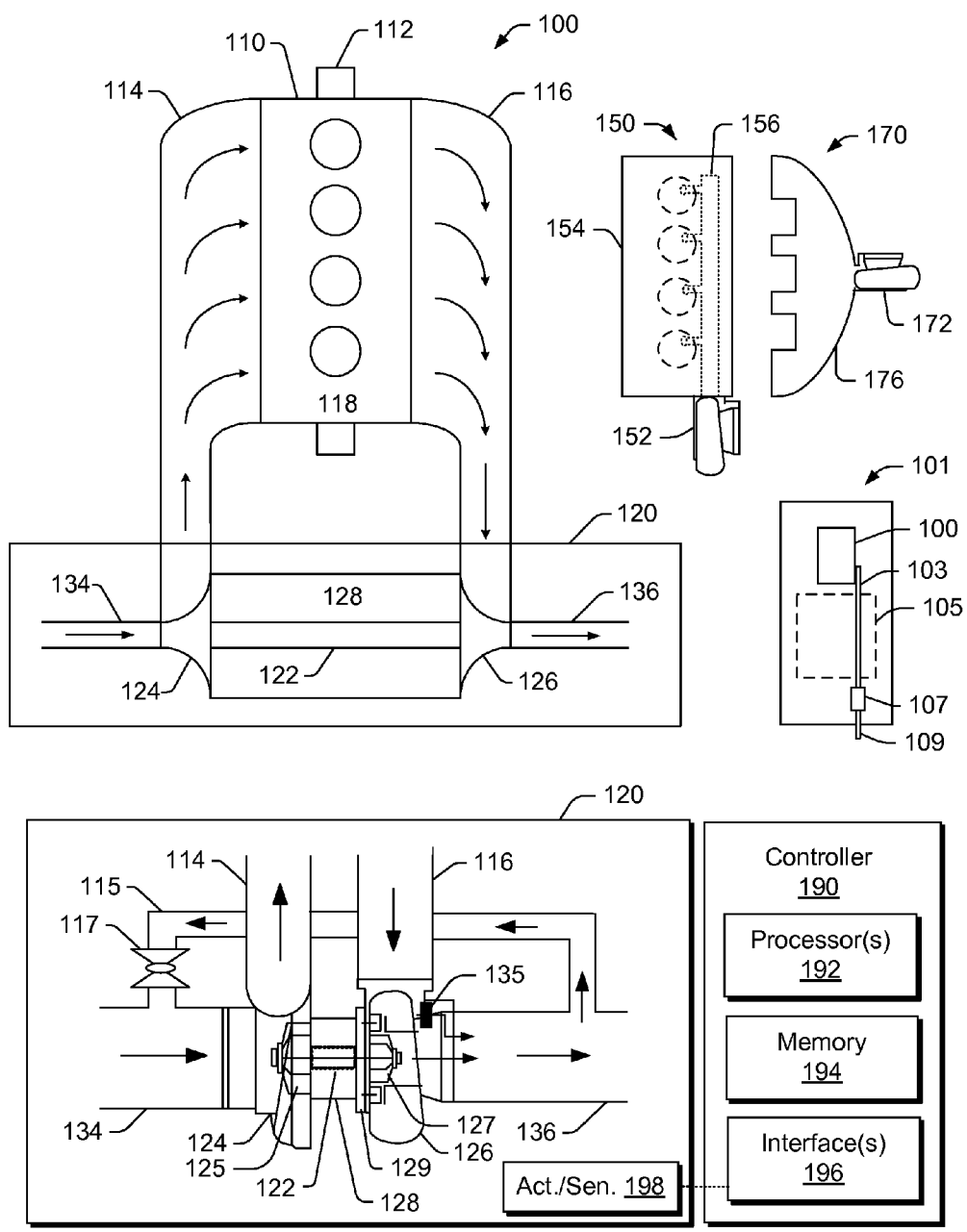
FIG. 1 is a diagram of an example of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Exhaust driven turbochargers can include a rotating shaft carrying a turbine wheel and a compressor wheel where the shaft is typically rotatably supported within a center housing (e.g., intermediate a compressor and a turbine) by one or more lubricated bearings (e.g., oil lubricated). During operation, exhaust from an internal combustion engine drives a turbocharger's turbine wheel, which, in turn, drives the compressor wheel to boost charge air to the internal combustion engine.

During operation, a turbocharger's rotating assembly may reach rotational speeds in excess of 100,000 rpm (e.g., some may reach rotational speeds of 250,000 rpm or more). To handle such high speeds, a turbocharger's center housing rotating assembly (CHRA) requires balance and adequate lubrication. Factors such as noise, vibration and harshness (NVH), as well as efficiency, are often interrelated and must be within acceptable limits. As to operational temperatures, consider as an example a diesel engine with exhaust that may be at about 860 degrees C. and consider as an example a gasoline engine with exhaust that may be at about 1050 degrees C. Exhaust can cause heating of various components of a CHRA, including bearings, etc., and heat energy may be transferred to lubricant that flows through a CHRA. As an example of interrelatedness, vibration can generate noise and reduce efficiency while heat energy, particularly with respect to cycling, may cause wear, changes to one or more clearances, etc. Under dynamic conditions, such as an increase in exhaust flow, axial thrust forces can cause contact between various CHRA components. Contact can cause wear, which, in turn, can alter balance, leading to increased noise, vibration, etc., and reduced efficiency. Factors such as noise, vibration, wear, etc. may lead to failure of one or more components of a turbocharger.

Turbocharger bearing systems may offer both support and damping to control motion of a turbocharger shaft, for example, to help isolate vibrations from rotating parts while allowing the turbocharger shaft to spin, for example, at speeds that may be about 60 times faster than a maximum engine speed (e.g., consider a diesel engine). A turbocharger bearing system may help ensure turbocharger operational efficiency by keeping frictional losses and NVH low such that energy from the engine exhaust gas is available to drive the turbocharger. Where operational conditions may vary, a turbocharger bearing system may be selected to help balance low-power losses with an ability to control forces applied by varying mechanical loading (e.g., thrust and other forces).

As to turbocharger bearing system hydrodynamics, fluid (e.g., oil or other lubricant) may lubricate components and also influence motion of a turbocharger shaft. As an example, a "fully-floating" bearing system can include a journal bearing that supports a shaft using an outer film disposed between a bore wall of a center housing and an outer surface of the journal bearing and an inner film disposed between an inner surface of the journal bearing and an outer surface of the shaft. In such an example, the journal bearing may rotate (azimuthally) at approximately one-half the speed of the shaft and move axially and radially (i.e., the journal bearing is fully-floating).

As to a "semi-floating" approach, an anti-rotation mechanism may act limit rotation (azimuthally) of a journal bearing or, for example, an outer race of a rotating element bearing (REB) assembly. As an example, a semi-floating journal bearing or a semi-floating REB assembly may support a shaft using, in part, an outer oil film disposed between an outer surface of the journal bearing or an outer surface of the REB assembly and a bore wall of a center housing where the outer oil film acts as a "squeeze film", for example, to damp undesirably shaft motions.

As an example, a turbocharger may include one or more rolling element bearing (REB) assemblies, which may be, for example, one or more ball bearing assemblies. An REB assembly can include an outer race, an inner race and rolling elements disposed between the inner and outer races (e.g., in a raceway or raceways). For example, consider an REB assembly that includes a unitary outer race and a two-piece inner race fit to a turbocharger shaft (e.g., a shaft and wheel assembly (SWA) where rolling elements allow for rotation of the shaft and two-piece inner race with respect to the outer race). In such an example, the outer race of the REB assembly may be "located" in a bore of a housing such as a center housing (e.g., disposed between a compressor housing and a turbine housing). As an example, to axially locate an outer race in a bore of a center housing, a counter-bore and a plate may be positioned at a turbine side and a compressor side of the center housing where each forms an opening with a diameter less than an outer diameter of the outer race. In such an example, the REB assembly may be placed in the bore followed by receipt of a shaft (e.g., a SWA) or, for example, the REB assembly may be fit to the shaft (e.g., a SWA) and then inserted into the bore (e.g., as a unit that includes the REB assembly and the shaft). Further, an anti-rotation mechanism may be provided that locates the outer race in the bore of the center housing by limiting rotation of the outer race (e.g., azimuthal direction). In such an example, the REB assembly may be "semi-floating", for example, having an ability to move in a radial direction where radial clearances between an outer surface of the outer race and a bore surface of the center housing provide for squeeze film formation (e.g., one or more lubricant films).

As an example, a turbocharger bearing assembly can include a spacer configured to space two turbocharger bearings. Such a spacer may be configured as an annular body that defines a central through bore and that includes an axial end face and an opposing axial end face. In such an example, the spacer may include a diameter (e.g., or radii) that may optionally provide for an interference fit with respect to a wall or walls of a bore of a housing. For example, a spacer may be interference-fit into a bore of a housing to be retained in the bore of the housing with a static force sufficient to axially locate one or more bearing assemblies. In such an example, the spacer may space and, at least in part, axially locate a compressor side bearing assembly and a turbine side bearing assembly, which may be, for example, rolling element bearing (REB) assemblies (e.g., ball bearing assemblies). As another example, a spacer may be integral to a housing, for example, formed by machining a housing with a through bore and a compressor side and a turbine side counterbore, countersink, etc. (e.g., where a spacer bore portion exists between the counterbores, countersinks, etc.). As an example, a spacer may be an integral portion of a bore or a separate component, for example, that may be interference fit into a bore and/or located via one or more locating pins, one or more retaining rings, etc.

As an example, a spacer may include a spring or springs, for example, where such a spring or springs may act to damp axial thrust forces, enhance balanceability (e.g., of a CHRA), etc. As an example, a spring may be provided as a biasing unit or biasing mechanism, for example, with an end cap at each end of the spring. Such a unit or mechanism may be configured to simultaneously contact, via its end caps, a compressor side bearing assembly and a turbine side bearing assembly. For example, such a unit or mechanism may contact, via a first end cap, an outer race of a compressor side ball bearing assembly and may contact, via a second end cap, an outer race of a turbine side ball bearing assembly.

As an example, a method can include interference-fitting a spacer into a bore of a housing, inserting a shaft with a first rolling element bearing assembly fitted thereto into the bore where the shaft extends axially through the spacer and inserting a second rolling element bearing assembly into the bore while fitting it to the shaft. For example, the housing may be a turbocharger center housing, the shaft may be a shaft and wheel assembly (SWA), the first rolling element bearing assembly may be a turbine side rolling element bearing assembly and the second rolling element bearing assembly may be a compressor side rolling element bearing assembly. A method may further include operating a turbocharger while axially locating, via a spacer, a turbine side rolling element bearing assembly and a compressor side rolling element bearing assembly where a spacer is disposed axially between the two rolling element bearing assemblies by having been interference-fit into a bore of a housing of the turbocharger. In such an example, the spacer may provide for contacting an outer race of the turbine side rolling element bearing assembly and for contacting an outer race of the compressor side rolling element bearing assembly.

As an example, a spacer may be an assembly, for example, that includes one or more springs and one or more end caps. As an example, a spring may be disposed in a central through bore of a spacer and located via end caps in which the spring is seated. For example, a wave spring may have an uncompressed length that exceeds a length of a spacer such that the wave spring can load one or more bearing assemblies disposed adjacent to the spacer (e.g., via contact formed by end caps in which the wave spring is seated). As an example, squeeze films of an outer race of a turbine side rolling element bearing assembly and an outer race of a compressor side rolling element bearing assembly (e.g., with respect to respective clearances with bore wall portions) may, in combination with a spring disposed between end caps that are located in a bore of a spacer, enhance performance of a turbocharger (e.g., a turbocharger CHRA). As an example, performance may be enhanced by a spring, for example, as to balanceability. As an example, one or more squeeze films may help to enhance performance, for example, by damping vibrations, etc. that may occur during operation of a turbocharger. As an example, an outer race of one or more bearing assemblies may be fully-floating or semi-floating.

As an example, an end cap may include one or more lubricant wells located at an axial end face. For example, a first end cap may include an annular compressor end well and a second end cap may include an annular turbine end well. Such features may act as thrust pads with respect to outer races. As an example, formation of one or more lubricant films may occur between an end cap and a bearing assembly. With increased damping provided by lubricant films and spring loading, certain vibrations may be diminished in dynamic imbalance measurements, which may allow for improved assembly balancing (e.g., to reduce NVH).

As an example, a spring may include opposing end caps where, in a CHRA, the spring maintains contact between one of the end caps and a compressor side outer race and maintains contact between the other one of the end caps and a turbine side outer race. In such an example, the force applied by the spring may cause material-to-material contact (e.g., metal-to-metal contact, etc.) thereby forming a material-to-material interface. During operation, an amount of lubricant may migrate to the contacting surfaces, which may alter friction coefficient therebetween (e.g., as to rotation of an end cap surface with respect to an outer race surface). Such an amount may be insufficient to form a lubricant film of a thickness sufficient to damp axial forces. As an example, an end cap surface and/or an outer race surface may include one or more lubricant passage features. Depending on the size, shape, etc. of such one or more features, lubricant may be of a thickness sufficient to provide for an amount of damping of forces (e.g., axial forces, etc.).

Figure 2:
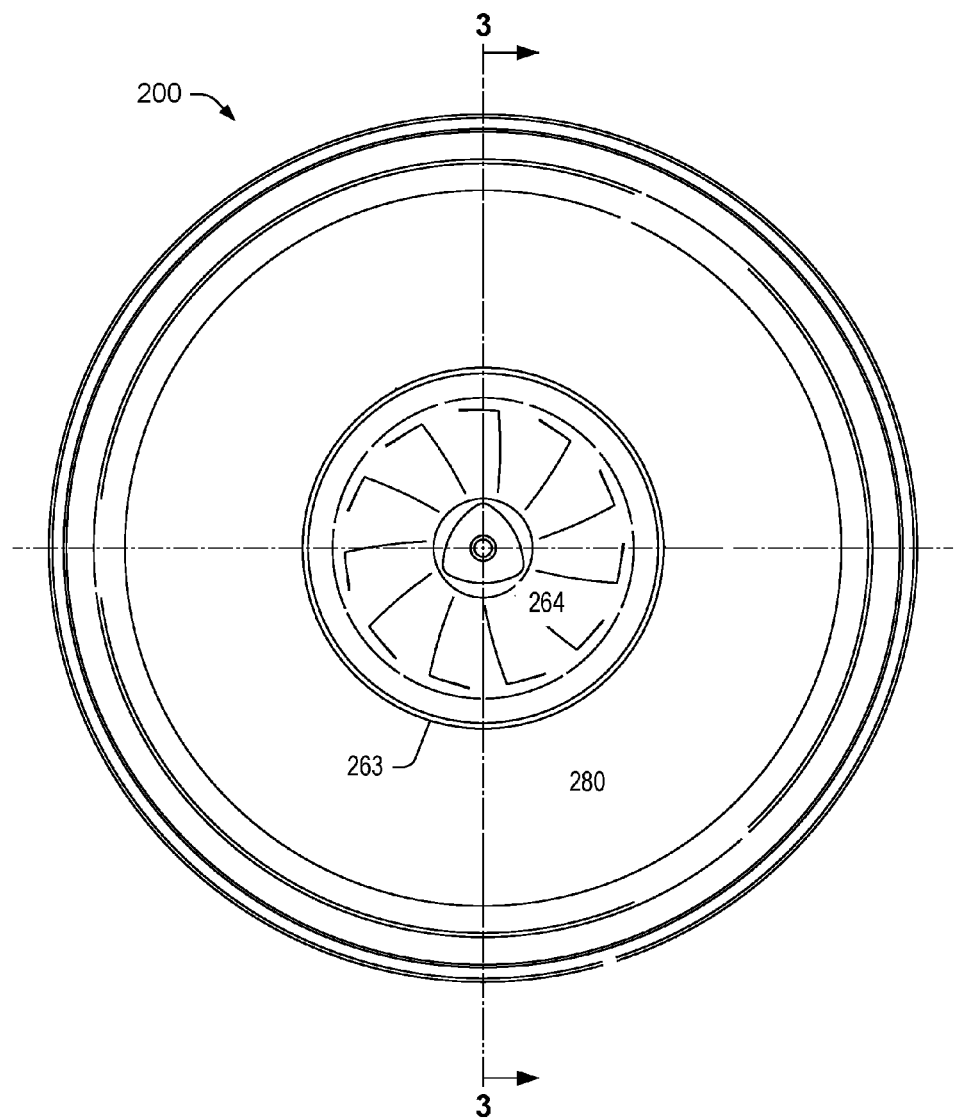
FIG. 2 shows an end view of an example of a turbocharger assembly.
Figure 3:
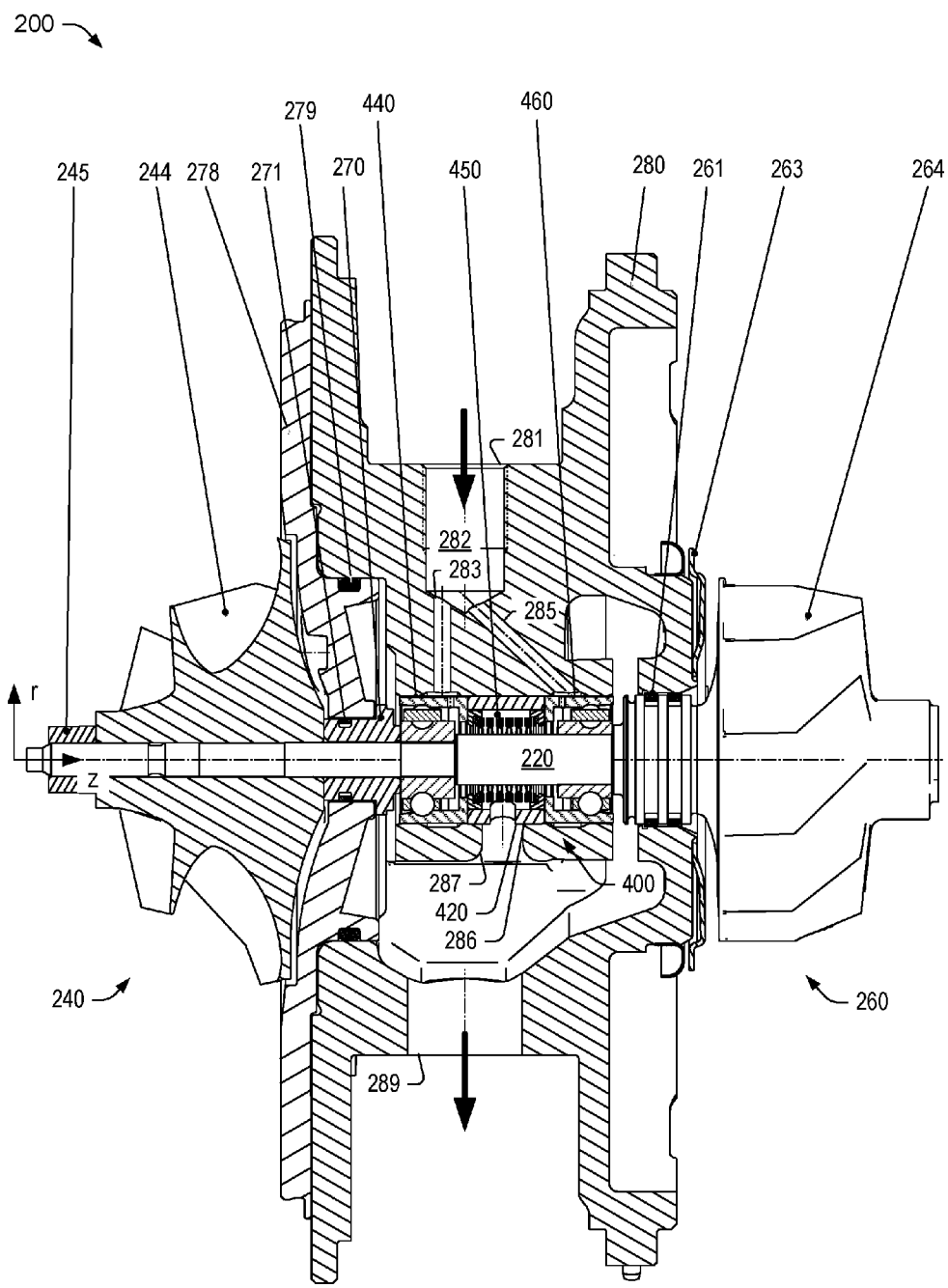
FIG. 3 shows a cutaway view of the turbocharger assembly of FIG. 2 along a line 3-3.

FIGS. 2 and 3 show an example of a center housing assembly 200 such as a CHRA assembly. As shown, the center housing assembly 200 can include a shaft 220 supported by a bearing assembly 400 disposed in a housing 280 between a compressor end 240 and a turbine end 260 of the center housing assembly 200. Various components of the bearing assembly 400 are described further below and, in particular, with respect to FIG. 4.

As shown in FIG. 3, a compressor wheel 244 may be fit to the shaft 220 and secured via a nut 245 while a turbine wheel 264 may be an integral portion of the shaft 220, for example, via welding (e.g., to form a shaft and turbine wheel assembly). As an example, one or more seal rings 261 may be disposed in grooves of a portion of the shaft 220, for example, to form a seal with a bore of the housing 280 (e.g., a seal to hinder outward flow of lubricant and inward flow of exhaust). As an example, a heat shield 263 may be disposed between the turbine wheel 264 and the housing 280, which may act to diminish heat transfer from exhaust gas to the housing 280 (e.g., and the bearing assembly 400, etc.). In the example of FIGS. 2 and 3, the center housing assembly 200 also includes a collar 270 disposed in a bore of a compressor plate 278 and about a portion of the shaft 220. As an example, the thrust collar 270 may include a seal ring 271 and the compressor plate 278 may include a seal ring 279 that may form a seal with the housing 280. Such features may hinder flow of lubricant and air between a compressor space and a housing space.

In the example of FIGS. 2 and 3, the housing 280 includes a lubricant inlet 281 and a lubricant outlet 289. As indicated by arrows, lubricant may flow from the inlet 281 to the outlet 289 via a bore 282 that directs lubricant to various lubricant passages with openings along an axial bore 286 of the housing 280. For example, the housing 280 includes a compressor side bearing lubricant passage 283 and a turbine side bearing lubricant passage 285. Lubricant may exit the bore 286 via a compressor end, a turbine end and/or a passage 287 disposed between the compressor end and the turbine end. The outlet 289 collects lubricant that flows through or around the bearing assembly 400, which may then be cooled, filtered, etc., and eventually recirculated to the inlet 281 (e.g., via a lubricant pump of an internal combustion engine). To assist with flow of lubricant, the inlet 281 and the outlet 289 may be aligned with gravity. As an example, in a non-operational state, a rotating assembly may rest in the bore 286 along a lower bore wall surface (e.g., due to gravity). Upon commencement of an operational state, the rotating assembly may lift off a bore wall surface, for example, at least in part due to lubricant flow, lubricant film formation, etc.

As shown in the example of FIGS. 2 and 3, the bearing assembly 400 includes a spacer 420, a compressor side rolling element bearing 440, a spring 450 (e.g., or springs, etc.) and a turbine side rolling element bearing 460. As mentioned, during operation, thrust forces may be generated and transmitted along an axial direction, as represented by a z-axis. Such forces may be directed toward the compressor end or toward the turbine end of the turbocharger assembly 200. As an example, the spring 450 may apply preload to the rolling element bearings 440 and 460, which may optionally assist with damping axial vibration. As an example, a spring may create a substantially constant force on a compressor side bearing to help stabilize a CHRA. As an example, a spring may be a biasing mechanism; accordingly, an assembly may include a spacer and a biasing mechanism. As an example, a spring may be part of a subassembly that may form in part, for example, a spring and spacer assembly (e.g., as a subassembly of a turbocharger assembly).

Figure 4:
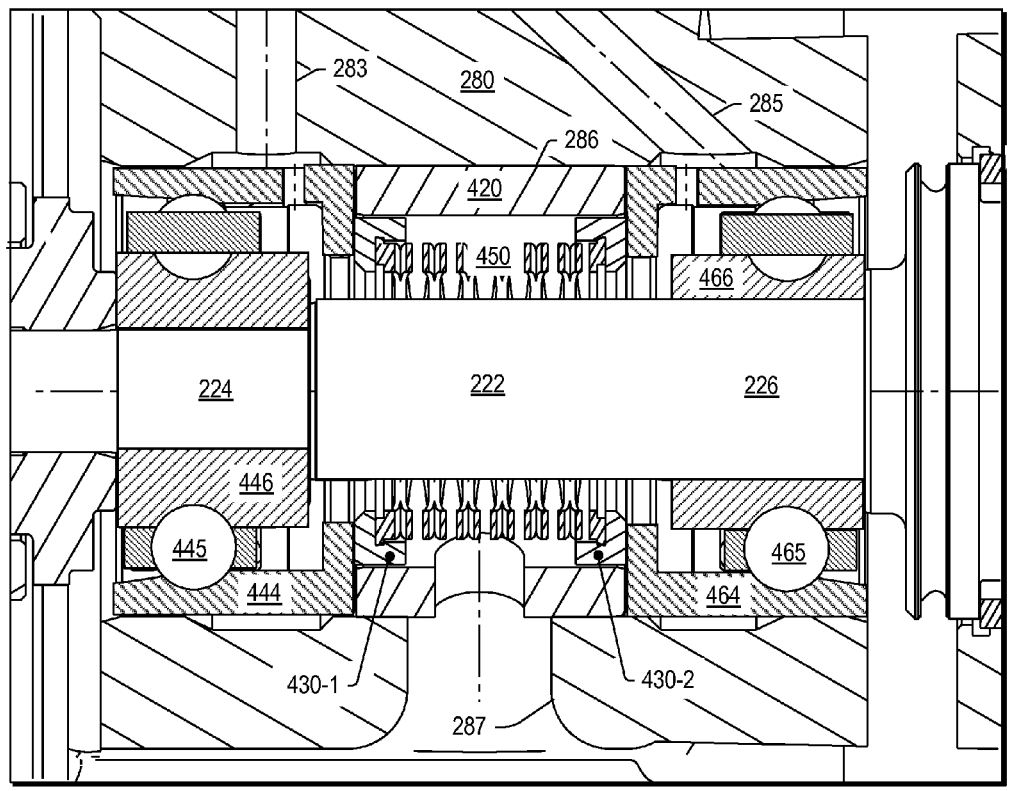
FIG. 4 shows an enlarged view of a portion of the turbocharger assembly of FIG. 3.

FIG. 4 shows an enlarged view of a portion of the center housing assembly 200 of FIGS. 2 and 3 where the shaft 220 may be defined in part via a spacer portion 222, a compressor side portion 224 and a turbine side portion 226. In the example of FIG. 4, the rolling element bearings 440 and 460 include outer races 444 and 464, respectively, and inner races 446 and 466, respectively, where rolling elements 445 and 465, respectively, allow for rotation of the inner races 446 and 466 with respect to the outer races 444 and 464. As shown in FIG. 4, the inner race 446 is attached to the compressor side portion 224 of the shaft 220 and the inner race 466 is attached to the turbine side portion 226 of the shaft 220. During operation, the inner races 446 and 466 rotate with the shaft 220. Where, for example, the outer races 444 and 464 are not restricted in an azimuthal direction, rotation of the inner races 446 and 466 may cause their respective outer races 444 and 464 to rotate within the axial bore 286 of the housing 280. Where one or both of the outer races 444 and 464 parasitically rotate, the speed of rotation may be substantially less than that of their corresponding inner races 446 and 466.

As shown in the example of FIG. 4, end caps 430-1 and 430-2 seat the spring 450 in a manner that avoids contact between the spring 450 and the spacer 420. As shown, the spacer 420 includes a compressor side surface and a turbine side surface, the end cap 430-1 includes a compressor side surface and the end cap 430-2 includes a turbine side surface. In such an example, the end cap 430-1 may be referred to as a compressor side end cap and the end cap 430-2 may be referred to as a turbine side end cap. In the example of FIG. 4, the end caps 430-1 and 430-2 can act to avoid contact between the spring 450 and the outer races 444 and 464. As an example, an end cap or end caps may be operatively coupled to a spring, for example, via an interference fit, clamping, welding, gluing, etc. As an example, an end cap may be operatively coupled to a spring such that the two components do not separate. As an example, a spring may be fit to an end cap in a manner that allows rotation of the two components with respect to each other without the two components becoming decoupled.

Figure 5:
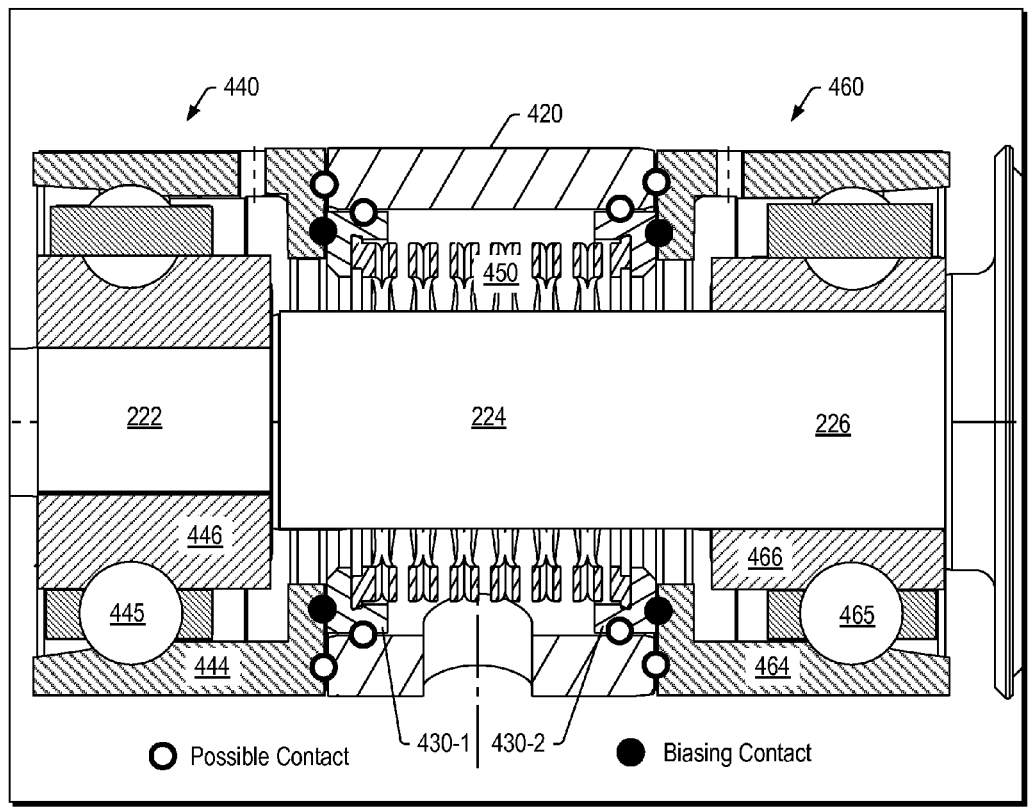
FIG. 5 shows an enlarged view of a portion of the turbocharger assembly of FIG. 3.

FIG. 5 shows an enlarged view of shaft portions 222, 224 and 226, the spacer 420, the end caps 430-1 and 430-2, the compressor side rolling element bearing 440, the spring 450 and the turbine side rolling element bearing 460. As shown in FIG. 4, the compressor side surface of the end cap 430-1 can contact an axial face of the outer race 444 of the compressor side rolling element bearing 440 and the turbine side surface of the end cap 430-2 can contact an axial face of the outer race 464. Also shown are possible contact points between a compressor side surface of the spacer 420 and the axial face of the outer race 444 of the compressor side rolling element bearing 440, a turbine side surface of the spacer 420 and the axial face of the outer race 464, a radial surface of the end cap 430-1 and an inner surface of the spacer 420, and a radial surface of the end cap 430-2 and an inner surface of the spacer 420.

As an example, the end caps 430-1 and 430-2 and the spring 450 may be rotatable with respect to the spacer 420. As an example, during operation, rotation of the outer race 444 may cause rotation of the end cap 430-1 and rotation of the outer race 464 may cause rotation of the end cap 430-2. In such an example, depending on how the spring 450 is coupled to the end caps 430-1 and 430-2, the spring 450 and the end caps 430-1 and 430-2 may rotate as a unit. As mentioned, the outer races 444 and 464 may rotate at rotational speeds that differ from that of the inner races 446 and 466, which are attached (e.g., interference fit) to respective portions 224 and 226 of the shaft 220. The end caps 430-1 and 430-2 together with the spring 450 (e.g., if rotatable within the spacer 420) may act to "couple" rotation of one of the outer races 444 and 464 with the other of the outer races 444 and 464. Such coupling may act to "equalize" rotation of the outer races 444 and 464, optionally to hinder rotation or to cause rotation, for example, based in part on a balance of forces. Such forces may include frictional forces associated with the end caps 430-1 and 430-2 within the spacer 420 and, for example, forces associated with rotation of the spring 450 within the spacer 420 (e.g., which may include an amount of fluid within its bore). As an example, the end caps 430-1 and 430-2 and the spring 450 may act as a clutch that may, via application of axial force, hinder and/or promote rotation of an outer race or outer races.

As an example, a spring with end caps may act to couple two outer races such that the outer races rotate, if rotatable, by an approximately equal amount. For example, the spring may apply biasing forces to the end caps such that the ends caps and the outer races rotate in unison. As an example, an end cap may act to protect an end of a spring against various forces. For example, where a spring is operatively coupled to an end cap in a manner such that they are fixedly coupled (e.g., no axial separation, no rotation, etc.), the end of the spring may be protected from frictional forces that otherwise may be transferred to the end of the spring if the end cap were not present.

As an example, where a spring without end caps is disposed within a spacer, frictional forces may change depending on the state of the spring. For example, as the spring compresses to a compressed state, surfaces of the spring may contact an inner bore surface of the spacer over a shorter axial distance compared to the spring being in less compressed state. In such an example, compression/decompression cycles of the spring may cause wear, particularly to the spring as it contacts the inner bore surface of the spacer. Further, where the spacer includes an opening, the spring may contact an edge or edges of the opening, which may cause additional wear. Yet further, if the spring rotates with respect to the spacer, wear may occur not only due to axial movement but to azimuthal rotation of the spring as well. As an example, the end caps 430-1 and 430-2 can act to isolate the spring 450 from various forces. Such an approach may enhance longevity and performance of the spring 450.

As an example, after assembly of a CHRA, the length of a spring (e.g., with end caps) may be relatively constant. For example, changes in length of the spring may be minimal (e.g., due to temperature changes, etc.). In such an example, the spring is in a compressed state such that it applies biasing force, for example, to an outer race to one side of the spring and an outer race to the other side of the spring. As mentioned, end caps may act to space radial surfaces of a spring a distance from a bore surface (e.g., or bore surfaces) of a spacer. In such an example, a relatively small clearance may exist between radial surfaces of the end caps and the bore surface (e.g., or bore surfaces) of the spacer.

As an example, where a spring has a relatively constant length during operation, ends caps operatively coupled to respect ends of the spring may act to avoid contact and frictional forces between radial surfaces of the spring and a bore surface (e.g., or bore surfaces) where the spring and/or end caps rotate. Such contact may otherwise cause a spring to wear, decrease spring life, decrease spring load, etc.

As an example, end caps such as the end caps 430-1 and 430-2 may act, at least in part, to regulate flow of lubricant. For example, end caps may be dimensioned and/or shaped to reduce flow of lubricant toward a spring seated by the end caps. Such an approach may act to reduce build-up of residue on the spring, which, in turn, may aid in functioning of the spring. As an example, an end cap may include an opening that is smaller than an opening of an end of an outer race. In such an example, a portion of lubricant exiting the opening of the outer race may contact a surface of the end cap rather than enter the opening of the end cap. As an example, an end cap may include a beveled surface that acts to direct lubricant. For example, an end cap may include a beveled surface that acts to direct lubricant toward an interface between the end cap and an outer race. Such an approach may help to ensure that the interface is adequately lubricated, as it may be subject to axial forces (e.g., thrust forces) and/or rotational forces.

As an example, an end cap may be made of a material such as a metal, an alloy, a high-temperature polymeric material, a composite material, etc. As an example, a material of construction may be selected and/or finished to achieve a desired coefficient of friction, for example, with respect to a surface of an outer race (e.g., an axially facing surface of an outer race). As an example, an end cap may be made of or include brass. As an example, an end cap may be made of or include polytetrafluoroethylene (PTFE). As an example, an end cap may be made of or include polyether ether ketone (PEEK). As an example, an end cap may include multiple materials of construction. For example, a polymeric material may be fit to a metal or alloy portion of an end cap. In such an example, the polymeric material may include one or more features (e.g., pads, lubricant channels, etc.). As an example, a polymeric material may provide an end of an end cap with a coefficient of friction that is less than that of a material of another portion of the end cap. As an example, a polymeric material may provide an amount of axial elasticity to an end cap, for example, for a relatively small amount of elastic deformation (e.g., due to spring force, etc.).

Figure 6:
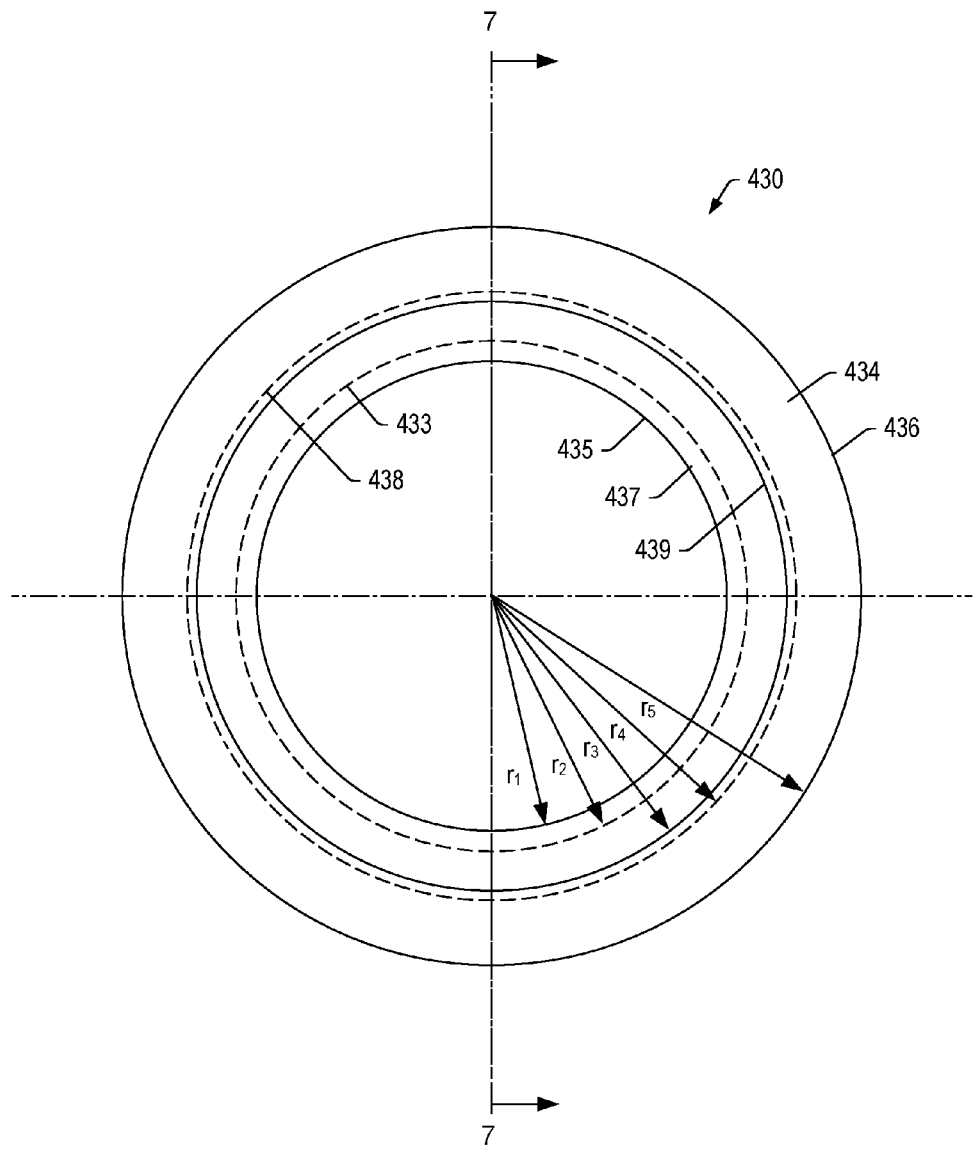
FIG. 6 shows an end view of an example of an end cap of a spring assembly.
Figure 7:
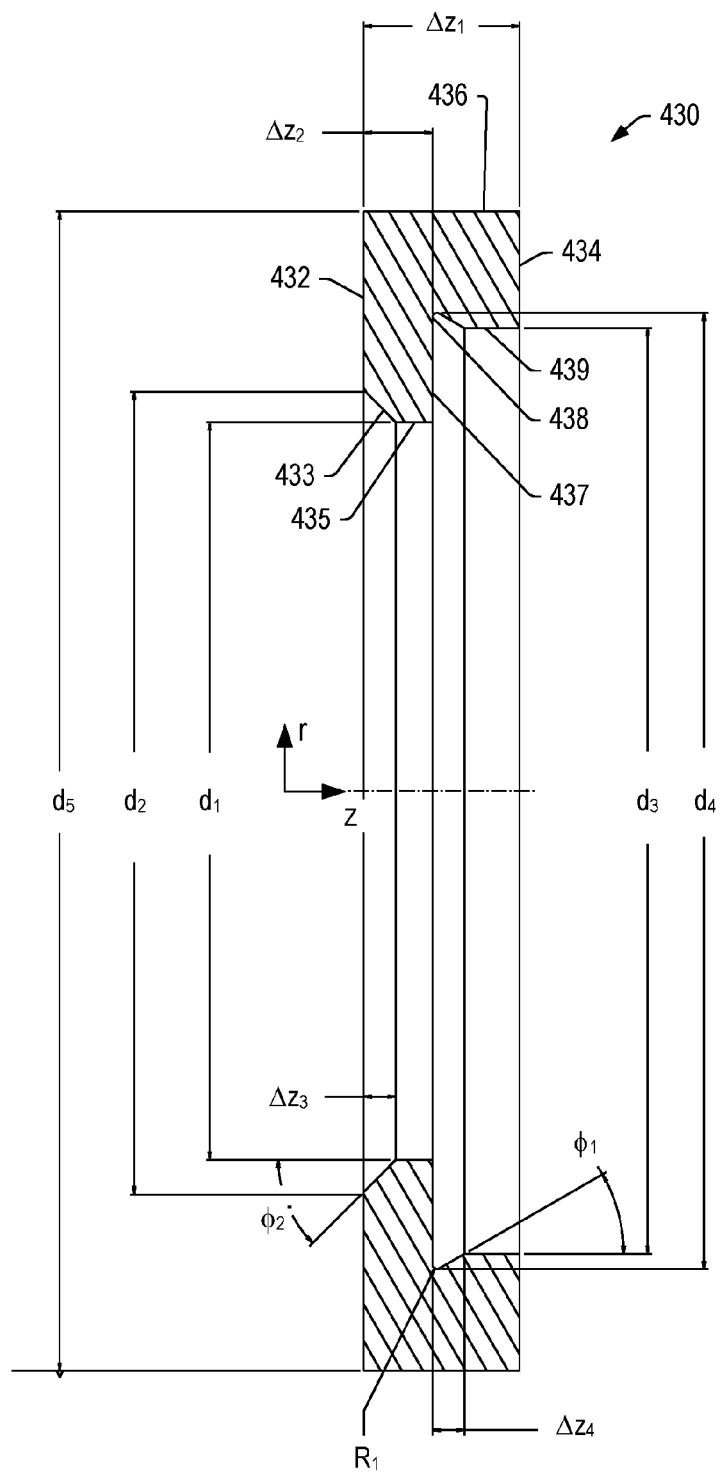
FIG. 7 shows a cutaway view of the end cap of FIG. 6 along a line 7-7.

FIG. 6 shows an example of an end cap 430, which may be one of the end caps 430-1 or 430-2. FIG. 7 shows the end cap 430 in a cutaway view along a line B-B. As shown in FIGS. 6 and 7, the end cap 430 includes opposing axial facing surfaces 432 and 434, an annular beveled surface 433, a first bore surface 435, an outer surface 436, an interior axial facing surface 437, an annular profiled surface 438 and a second bore surface 439. The features of the end cap 430 may be defined, for example, by radii, diameters, angles, axial lengths, etc. As shown in FIG. 6, radii $r_1$, $r_2$, $r_3$, $r_4$ and $r_5$ may define in part the first bore surface 435, the annular beveled surface 433, the second bore surface 439, the annular profiled surface 438 and the outer surface 436, respectively. As shown in FIG. 7, diameters $d_1$, $d_2$, $d_3$, $d_4$ and $d_5$ may define in part the first bore surface 435, the annular beveled surface 433, the second bore surface 439, the annular profiled surface 438 and the outer surface 436, respectively. Also shown in FIG. 7 are axial lengths $\Delta z_1$, $\Delta z_2$, $\Delta z_3$, and $\Delta z_4$ as well as angles $\phi_1$ and $\phi_2$. As an example, the angle $\phi_1$ may define in part the annular profiled surface 438, for example, to accommodate a portion of a spring. As an example, the angle $\phi_2$ may define in part the annular beveled surface 433.

As shown in FIGS. 6 and 7, the diameter $d_1$ or radius $r_1$ of the first bore surface 435 is less than the diameter $d_3$ or radius $r_3$ of the second bore surface 439. The diameter $d_1$ or radius $r_1$ may be selected to be greater than, equal to or less than a diameter or radius of a portion of a spring. For example, the diameter $d_1$ or radius $r_1$ may be equal to or less than an inner diameter or inner radius of a spring. As an example, the diameter $d_1$ or radius $r_1$ may be selected to regulate an amount of lubricant that may enter the end cap 430 from the axial facing surface 432 side toward the axial facing surface 434 side. In such an example, lubricant may be regulated in a manner that reduces flow of lubricant to a spring seated in the end cap 430.

As an example, the diameter $d_1$ (e.g., or radius $r_1$) may be selected to achieve a desired contact surface with the spring. As an example, the diameter $d_1$ (e.g., or radius $r_1$) may be selected to be sufficiently large to effect flow of lubricant. As an example, chamfers on end caps may facilitate lubricant exiting a rolling element bearing (e.g., and to reduce sharp edges, which may risk debris, imperfections, handling, etc.).

Figure 8A:
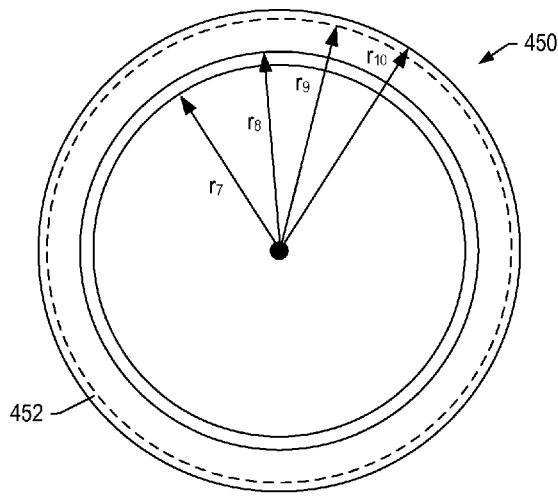
FIGS. 8A, 8B, 8C and 8D show views of an example of a spring of a spring assembly.
Figure 8C:
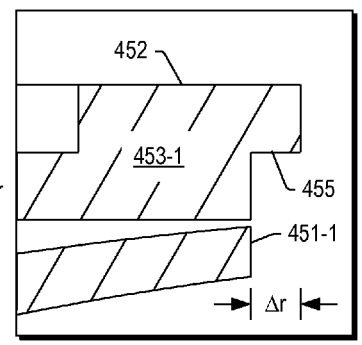
Figure 8B:
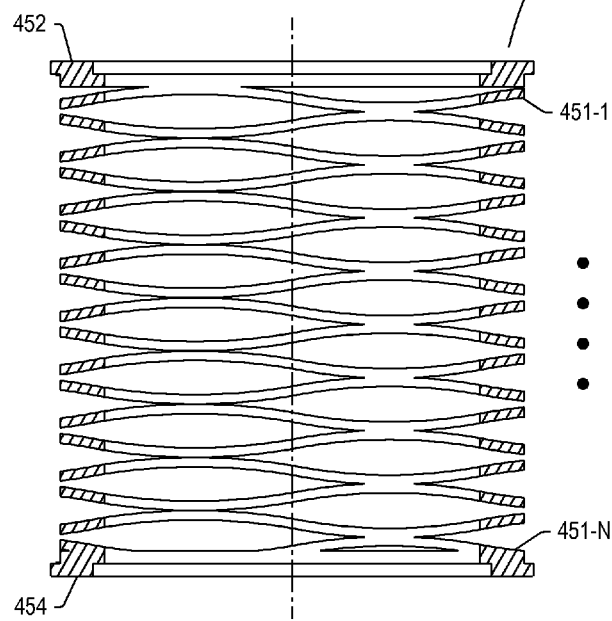
Figure 8D:
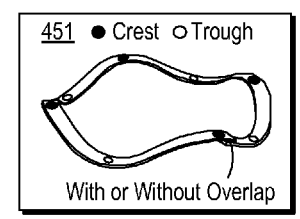

FIGS. 8A, 8B, 8C and 8D show an example of the spring 450. As shown, the spring 450 can include opposing axial facing surfaces 452 and 454 and a number of elements 451-1 to 451-N disposed therebetween. For example, the spring 450 is shown in FIG. 8B as including about 18 elements. FIG. 8D shows an example of an element 451, which may include crests and troughs (e.g., undulations) and be formed as a continuous element, for example, with or without overlapping ends. As shown in FIG. 8A, the spring 450 may be defined in part by various radii $r_7$, $r_8$, $r_9$, and $r_{10}$. As shown in FIG. 8C, the axial facing surface 452 has a radius $r_{10}$ (e.g., or diameter) that exceeds that of an element 451-1 (see, e.g., $r_9$). As shown in FIG. 8C, the axial facing surface 452 is substantially planar and part of an end feature 453-1 of the spring 450 where the end feature 453-1 includes an annular shoulder 455. As an example, the end feature 453-1 may be elastically deformable such that it can be seated within and end cap such as the end cap 430 of FIGS. 6 and 7. The resiliency of the end feature 453-1 may act to biasably secure the spring 450 with respect to the end cap 430, for example, such that the spring 450 does not disengage from the end cap 430 during operation of a turbocharger.

Figure 9:
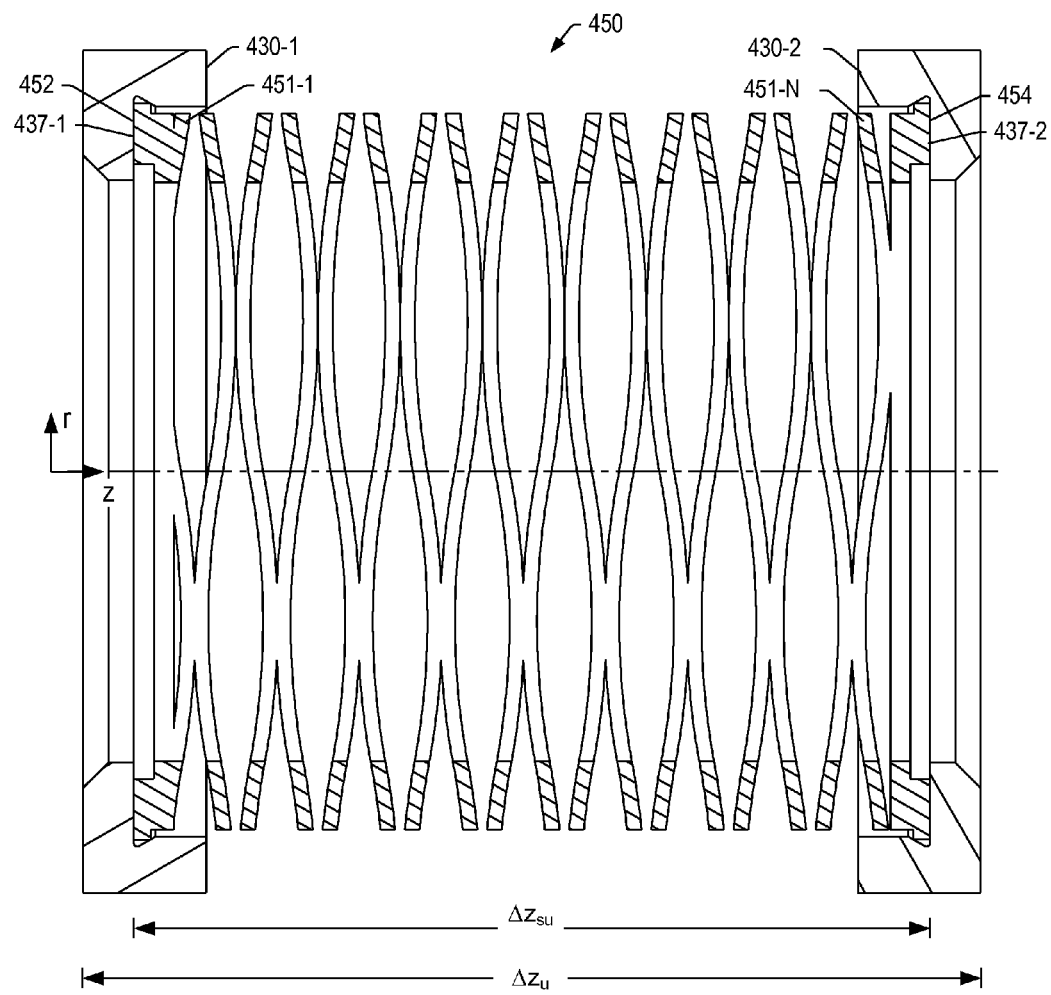
FIG. 9 shows an example of a spring assembly in an uncompressed state.
Figure 10:
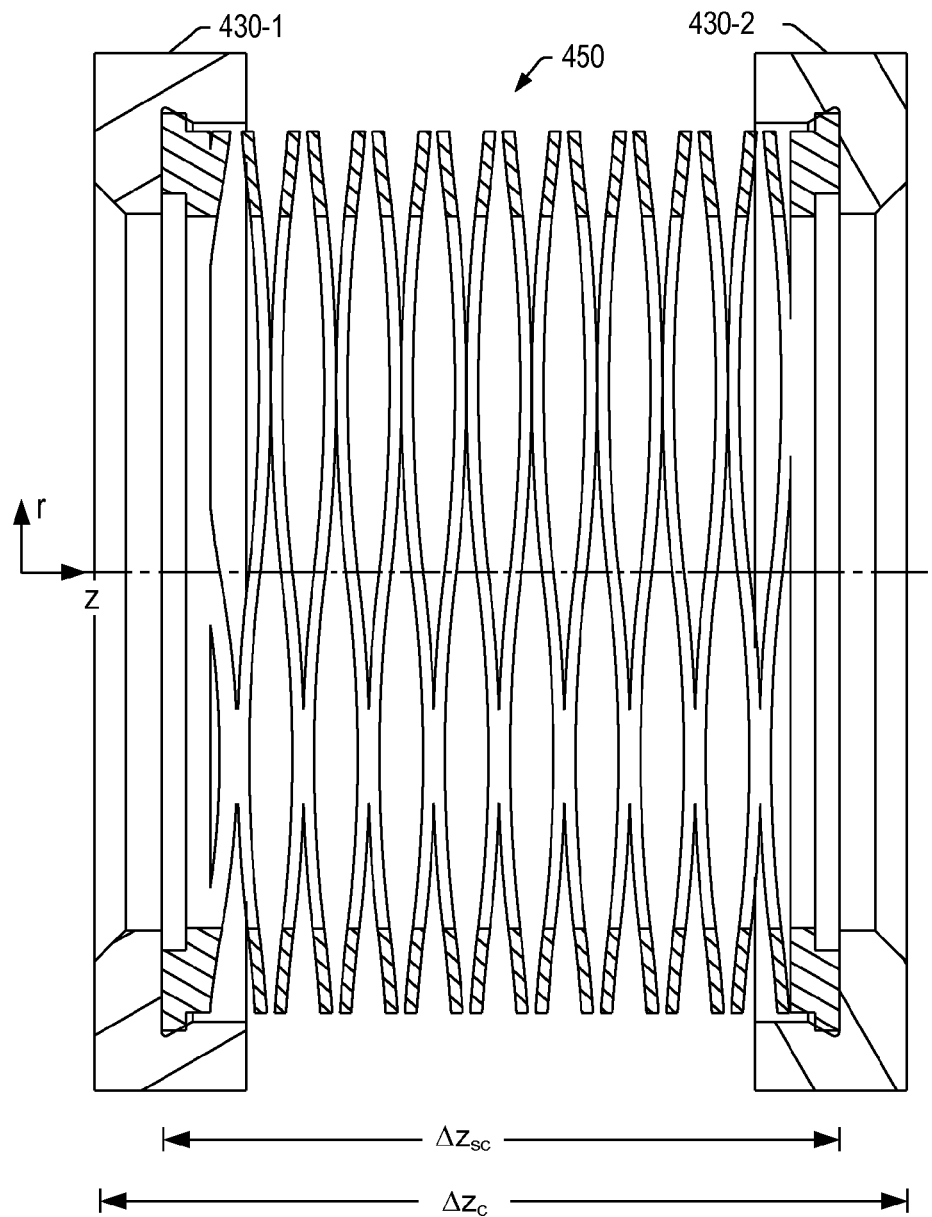
FIG. 10 shows the spring assembly of FIG. 9 in a compressed state.

FIGS. 9 and 10 show examples of the end caps 430-1 and 430-2 fitted to the spring 450 in an uncompressed state and in a compressed state. Dimensions are also shown, including $\Delta z_{s_u}$ and $\Delta z_u$ and $\Delta z_{s_c}$ and $\Delta z_c$.

FIGS. 11A, 11B and 11C show the end caps 430-1 and 430-2 and the spring 450 (e.g., as a subassembly) with respect to the spacer 420. As shown, the spacer 420 includes opposing axial facing surfaces 422 and 424, a bore surface 423, an outer surface 425 and an opening 427 (e.g., between the bore surface 423 and the outer surface 425). Also shown are an outer diameter $d_{12}$ and an inner diameter $d_{13}$ as well as an axial length $\Delta z_s$. FIG. 11B shows the spring 450 in an uncompressed state and FIG. 11C shows the spring 450 in a compressed state. In moving between these states, the end caps 430-1 and 430-2 can be located via the bore surface 423 of the spacer 420. In such a manner, the spring 450, itself, does not directly contact the spacer 420. As an example, a lubricant film may form between the outer surfaces of the end caps 430-1 and 430-2 and the bore surface 423 of the spacer 420. In such a manner, friction may be reduced such that the spring 450 operates with lesser resistance from the presence of the spacer 420.

Figure 12:
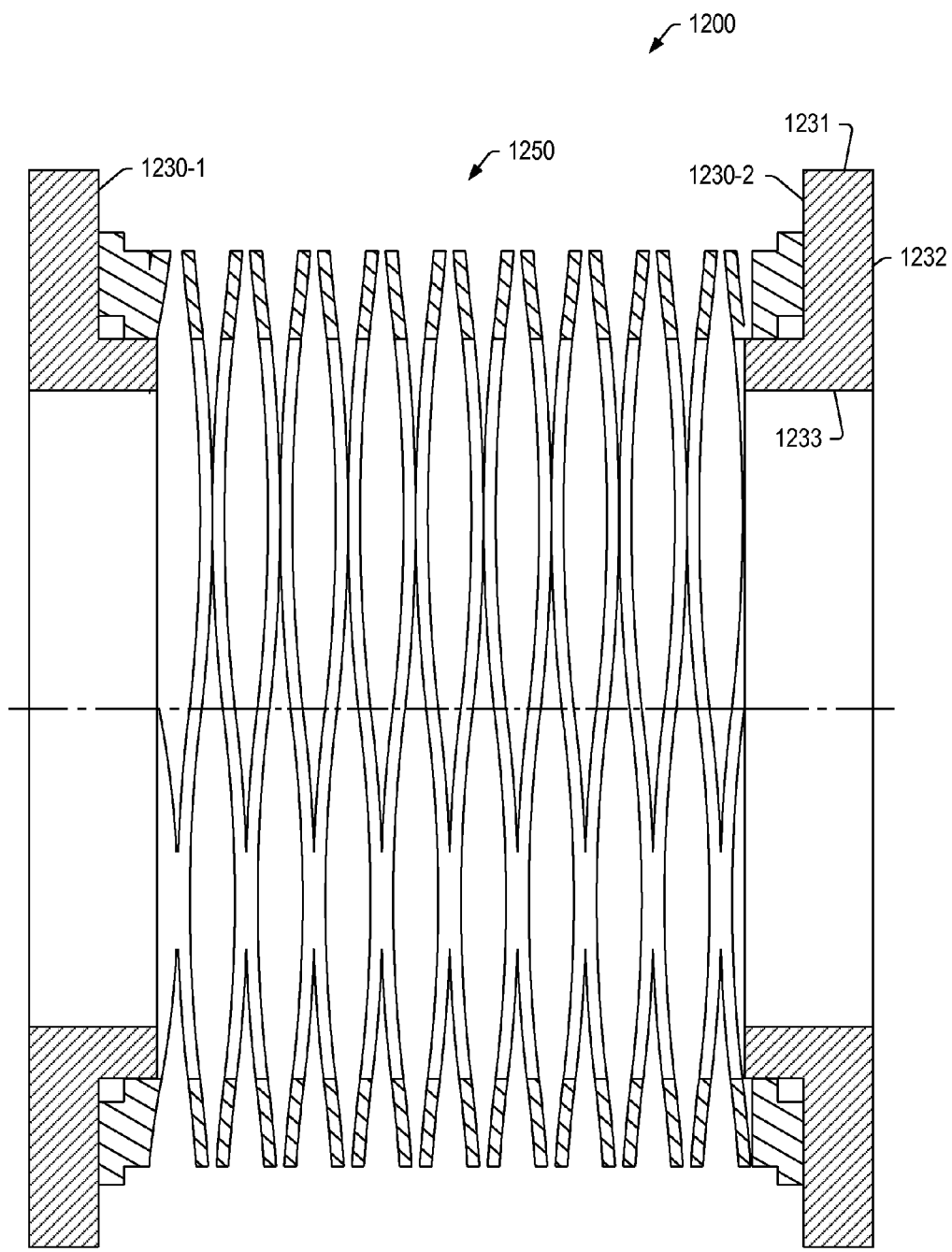
FIG. 12 shows an example of a spring assembly.

FIG. 12 shows an example of an assembly 1200 that includes an end cap 1230-1, an end cap 1230-2 and a spring 1250. In the example of FIG. 12, the end caps 1230-1 and 1230-2 have a flange portion 1231 and a cylindrical wall portion 1233 as well as an axially facing surface 1232 (e.g., at least in part as part of the flange portion 1232). As shown in the example of FIG. 12, the cylindrical wall portion 1233 may be received by the spring 1250, for example, where the spring 1250 includes an inner diameter (e.g., or spring elements) that can receive an outer diameter of the cylindrical wall portion 1233. Lubricant may act to diminish friction, wear, rotational coupling (e.g., rotation of an end cap, end caps, etc.), damp thrust forces, etc.

Figure 13:
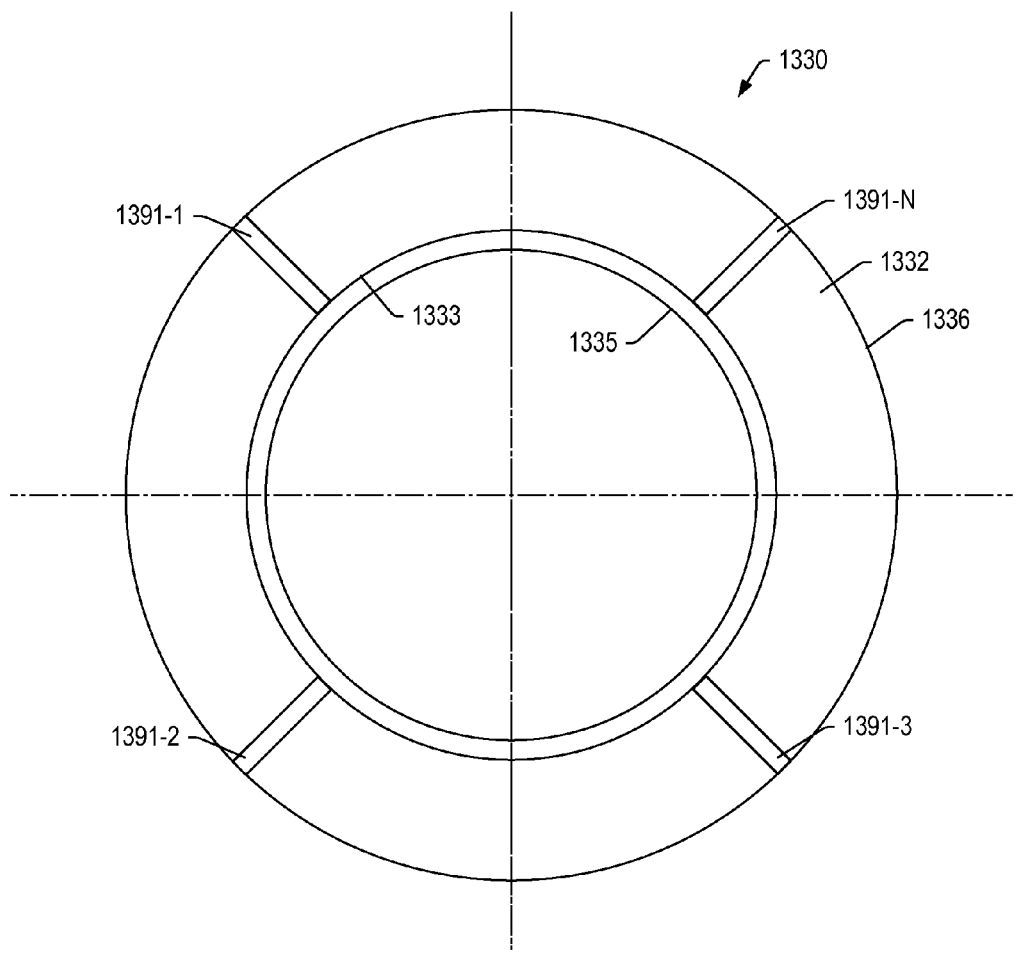
FIG. 13 shows an example of an end cap.

FIG. 13 shows an example of an end cap 1330 that includes an axially facing surface 1332, a beveled surface 1333, a bore surface 1335 and a radial surface 1336 (e.g., a radially facing surface). In the example of FIG. 13, the end cap 1330 also includes one or more lubricant channels 1391-1 to 1391-N. Such channels may allow for flow of lubricant, for example, at least in part in a radial direction (e.g., inwardly and/or outwardly).

Figure 14:
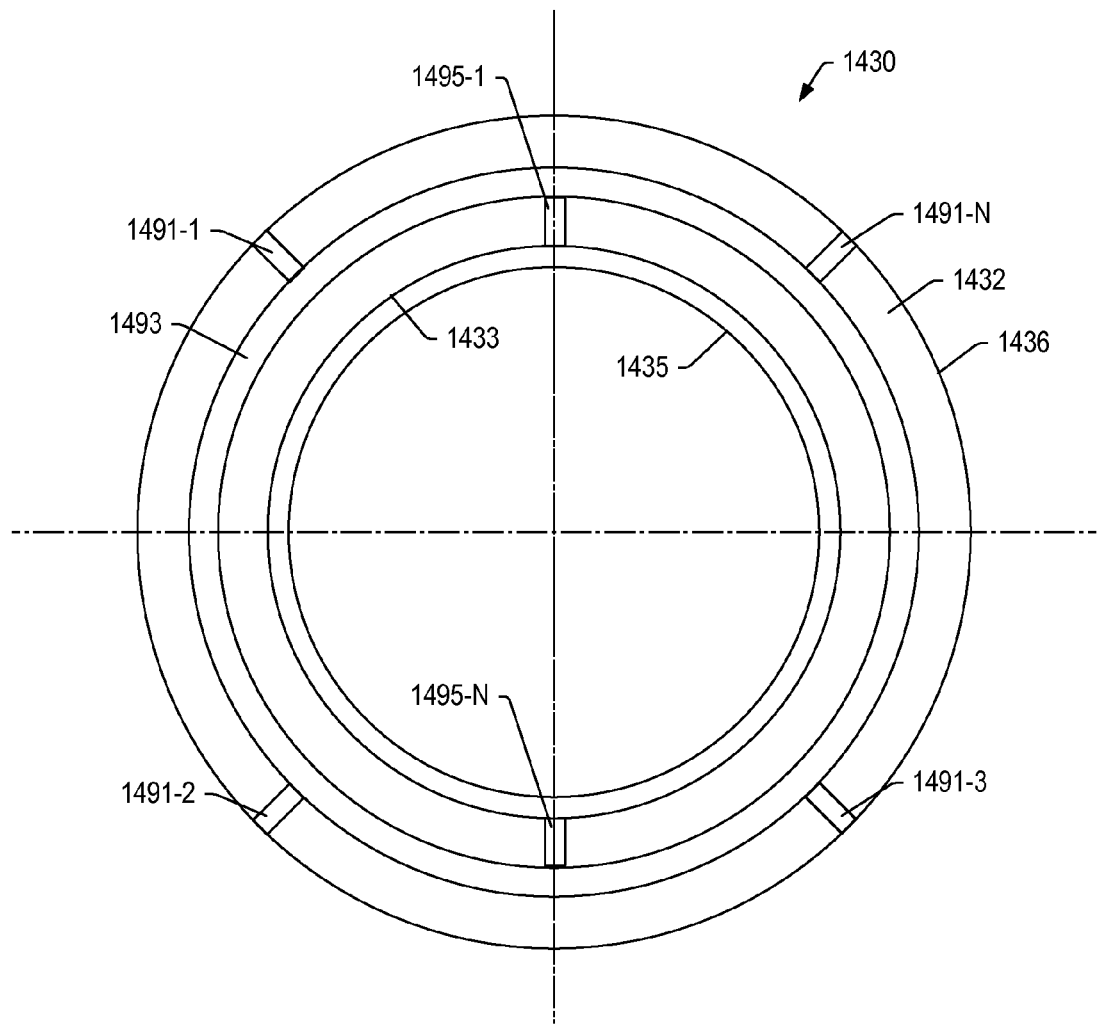
FIG. 14 shows an example of an end cap.

FIG. 14 shows an example of an end cap 1430 that includes an axially facing surface 1432, a beveled surface 1433, a bore surface 1435 and a radial surface 1436 (e.g., a radially facing surface). In the example of FIG. 14, the end cap 1430 also includes one or more lubricant channels 1491-1 to 1491-N, 1493 and 1495-1 to 1495-N. Such channels may allow for flow of lubricant, for example, at least in part in a radial direction (e.g., inwardly and/or outwardly). In the example of FIG. 14, the lubricant channel 1493 is illustrates as an annular channel that can allow for flow of lubricant in an azimuthal direction (e.g., clockwise and/or counter-clockwise). As an example, the one or more lubricant channels 1491-1 to 1491-N and 1495-1 to 1495-N may be azimuthally offset, for example, to diminish channeling of lubricant directly between end(s) at the beveled surface 1433 and end(s) at the radial surface 1436 (e.g., which may include a beveled edge, etc.).

Figure 15A:
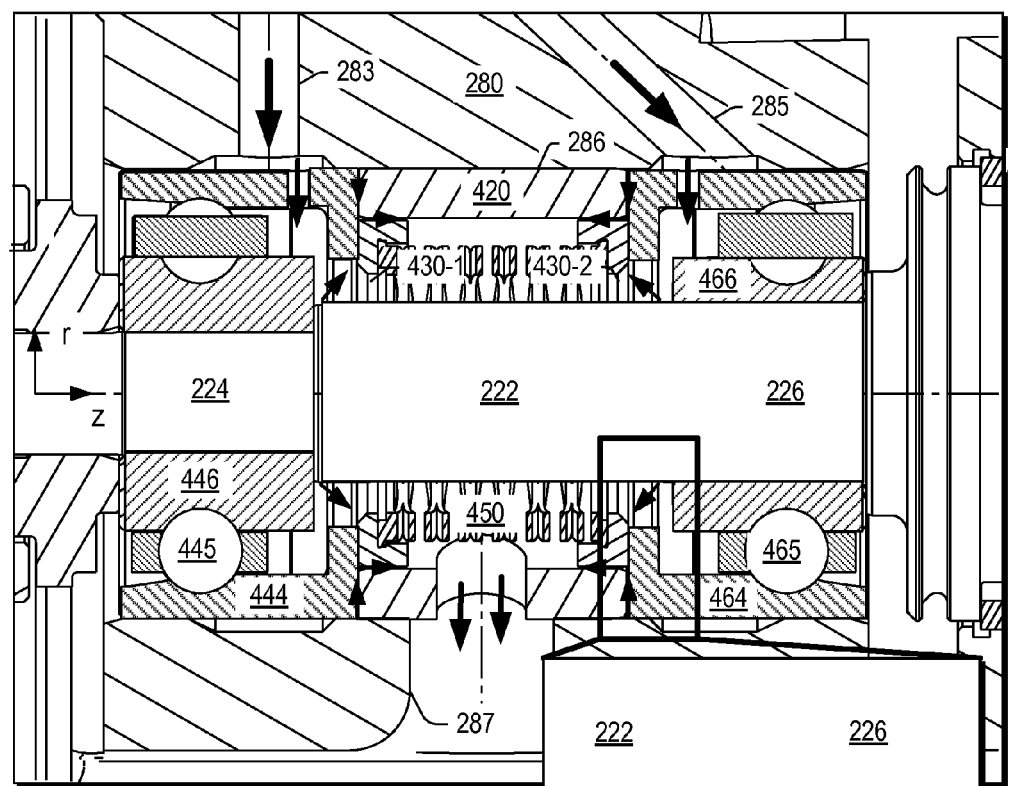
FIGS. 15A and 15B show views of lubricant flow in a portion of a turbocharger assembly.
Figure 15B:
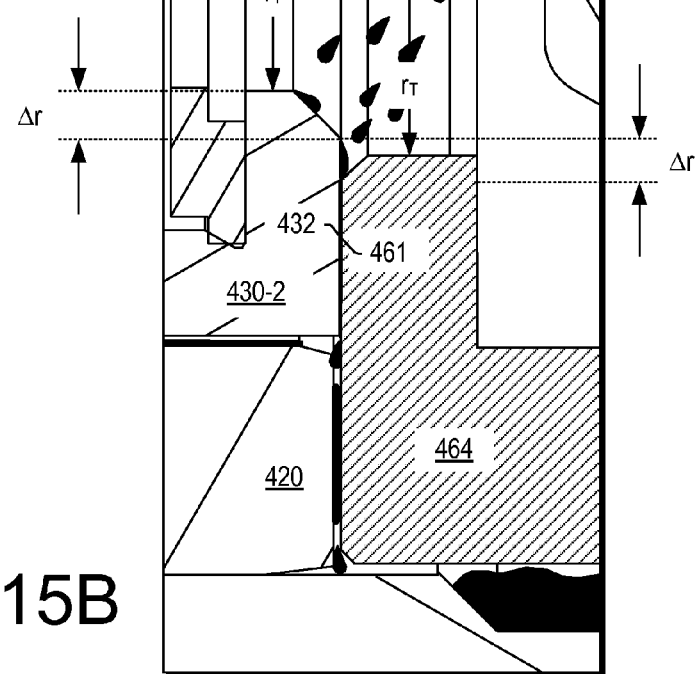

FIGS. 15A and 15B show views of a portion of the center housing assembly 200 of FIG. 2 with illustrations of examples of lubricant flow. As shown, the rolling element bearings 440 and 460 can include lubricant jet openings such that lubricant supplied under pressure via the lubricant passages 283 and 285 of the housing 280 enter the outer races 444 and 464 to lubricate the rolling elements 445 and 465 (e.g., sets of rolling elements). As shown, lubricant may contact the shaft 220 and, for example, due to rotation of the shaft 220, be ejected away from the shaft 220. As an example, lubricant may contact the annular beveled surface of the end cap 430-2 (e.g., or 430-1) and then flow toward the axial facing surface 432 of the end cap 430-2 (e.g., facilitated by one or more channels, for example, as in FIG. 13 or 14, etc.). As shown, the outer race 464 can include an axial facing surface 461 that faces the axial facing surface 432 of the end cap 430-2, for example, to form an interface. Lubricant may flow to such an interface and further flow, for example, to an interface between the spacer 420 and the outer race 464.

As shown in the example of FIG. 12B, the end cap 430-2 may include an annular beveled surface and the outer race 464 may include an annular beveled surface. As an example, such annular beveled surfaces may be offset where that of the end cap 430-2 is closer to the shaft 220 than that of the outer race 464. In combination, these annular beveled surfaces may form tiered lubricant drainage bevels that act to direct lubricant to surfaces that may contact, for example, to form a lubricant film therebetween (e.g., facilitated by one or more channels, for example, as in FIG. 13 or 14, etc.). As an example, a first end cap and a compressor side rolling element bearing form tiered lubricant drainage bevels and/or a second end cap and a turbine side rolling element bearing form tiered lubricant drainage bevels. As an example, an annular beveled surface of an outer race may form a lubricant collection "groove" with an axially facing surface of an end cap. Such a groove may collect lubricant that can be distributed radially outwardly therefrom, for example, to form a lubricant film between an end cap and an outer race and/or a spacer and an outer race.

As an example, a feature or features of an end cap may help to direct lubricant to one or more interfaces formed in part by an outer race. In such an example, the lubricant may form one or more films, which may help in handling axial thrust forces and/or rotational forces. As an example, a lubricant film may act to protect material surfaces from axial thrust forces (e.g., that may act to cause contact of two components) and/or a lubricant film may act to regulate rotational coupling of one component with respect to another component. As an example, a spring may be protected by use of end caps where the end caps can include one or more features that can facilitate lubricant film formation. In such an example, use of end caps may allow for selection of a spring from a group of springs where such springs need not be "specialized" for handling of various forces that may be imparted by, for example, an outer race of a rolling element bearing, a surface of a spacer, etc.

As an example, an assembly may include a plurality of springs. For example, a first spring may be seated in a first end cap at one end and include a free end and a second spring may be seated in a second end cap at one end and include a free end. In such an example, the free ends of the springs may be oriented to face each other, for example, within a spacer.

As an example, a bearing system can include two single row angular contact ball-bearings where, for example, squeeze films may be formed about outer races and a bore of a bearing housing (e.g., a center housing). In such an example, inner races of the bearings may be press-fit on to a shaft. As an example, end caps may be integrated into the bearing system, for example, to seat a spring where the end caps provide contact surfaces that can contact outer races (e.g., to avoid direct contact between the spring and the outer races). Such a spring may function to achieve a linear rotor dynamic system and, for example, make a bearing system less sensitive to tolerance. As an example, a spring may be centered by its outer diameter as set in end caps, for example, such that active coils (e.g., elements) do not contact a bore (e.g., of a spacer). As an example, end caps may be directly clamped to last coils or end features of a spring. Such end caps may be made of wear resistant material, for example, to avoid wear. As an example, end cap surfaces may be treated, for example, to achieve wear resistant properties, frictional properties, etc. End caps may act to center a spring in a bore diameter and, for example, avoid contact of one or more components (e.g., a bore surface) with active coils or elements the spring (e.g., at the outer diameter of such coils or elements).

As an example, a turbocharger bearing assembly can include a spacer that includes an axial through bore, a compressor side surface and a turbine side surface; a compressor side rolling element bearing that includes an outer race surface that faces the compressor side surface of the spacer; a turbine side rolling element bearing that includes an outer race surface that faces the turbine side surface of the spacer; and a spring seated between a first end cap disposed at least in part in the axial through bore of the spacer and a second end cap disposed at least in part in the axial through bore of the spacer where the spring biases an axially facing surface of the first end cap against the outer race surface of the compressor side rolling element bearing and where the spring biases an axially facing surface of the second end cap against the outer race surface of the turbine side rolling element bearing. In such an example, the first and second end caps can include an end cap outer diameter and the axial through bore of the spacer can include a through bore diameter that exceeds the end cap outer diameter where, for example, the spring can include a spring outer diameter that is less than the end cap outer diameter.

As an example, an outer race surface of a compressor side rolling element bearing can include an outer race opening having an outer race opening diameter and an axially facing surface of a first end cap can include an end cap opening having an end cap opening diameter that is less than the outer race opening diameter. In such an example, the first end cap can include an outwardly axially facing annular beveled surface disposed about the end cap opening where, for example, the outwardly axially facing annular beveled surface directs lubricant toward the axially facing surface of the first end cap.

As an example, an outer race surface of a turbine side rolling element bearing can include an outer race opening having an outer race opening diameter and an axially facing surface of the second end cap can include an end cap opening having an end cap opening diameter that is less than the outer race opening diameter. In such an example, the second end cap can include an outwardly axially facing annular beveled surface disposed about the end cap opening.

As an example, in an assembly, at least one of a first end cap (e.g., fit to a spring) and a second end cap (e.g., fit to a spring) can include at least one lubricant channel.

As an example, in an assembly, at least one of a first end cap and a second end cap can include or be formed of a polymeric material.

As an example, in a turbocharger bearing assembly, a spring may be disposed at least in part in a spacer (e.g., a bore of the spacer) where the spring does not directly contact the spacer (e.g., does not directly contact a bore surface of the spacer).

As an example, in an assembly, a first end cap can include a recess and a spring can include an end feature seated at least partially in the recess of the first end cap and/or a second end cap can include a recess and a spring can include an end feature seated at least partially in the recess of the second end cap.

As an example, in a turbocharger bearing assembly, a sum of an annular dimension of a compressor side surface of a spacer and an annular dimension of an axially facing surface of a first end cap can exceed an annular dimension of an outer race surface of a compressor side rolling element bearing and/or a sum of an annular dimension of a turbine side surface of a spacer and an annular dimension of an axially facing surface of a second end cap exceed an annular dimension of an outer race surface of a turbine side rolling element bearing.

As an example, in a turbocharger bearing assembly, at least one of a first end cap and a second end cap can include a cylindrical wall portion and a flange portion where, for example, the cylindrical wall portion can include an inner diameter that receives an outer diameter of a spring or, for example, the spring can include an inner diameter that receives an outer diameter of the cylindrical wall portion.

As an example, in a turbocharger bearing assembly, a first end cap and a compressor side rolling element bearing can form tiered lubricant drainage bevels and/or a second end cap and a turbine side rolling element bearing can form tiered lubricant drainage bevels.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger bearing assembly comprising:
    a spacer that comprises an inner surface at an inner diameter that defines an axial through bore, an outer surface at an outer diameter, a compressor side surface and a turbine side surface;
    a compressor side rolling element bearing that comprises an outer race surface that faces the compressor side surface of the spacer wherein the outer race comprises an outer diameter that exceeds the inner diameter of the spacer;
    a turbine side rolling element bearing that comprises an outer race surface that faces the turbine side surface of the spacer wherein the outer race comprises an outer diameter that exceeds the inner diameter of the spacer; and
    a spring seated between a first end cap disposed at least in part in the axial through bore of the spacer and a second end cap disposed at least in part in the axial through bore of the spacer wherein the spring biases an axially facing surface of the first end cap against the outer race surface of the compressor side rolling element bearing, wherein the spring biases an axially facing surface of the second end cap against the outer race surface of the turbine side rolling element bearing, wherein the first and second end caps comprise an end cap outer diameter that is less than the inner diameter of the spacer and wherein the spring comprises an outer diameter that is less than the end cap outer diameter to avoid direct contact between the spring and the spacer.

2. The turbocharger bearing assembly of claim 1 wherein the outer race surface of the compressor side rolling element bearing comprises an outer race opening having an outer race opening diameter and wherein the axially facing surface of the first end cap comprises an end cap opening having an end cap opening diameter that is less than the outer race opening diameter.

3. The turbocharger bearing assembly of claim 2 wherein the first end cap comprises an outwardly axially facing annular beveled surface disposed about the end cap opening.

4. The turbocharger bearing assembly of claim 3 wherein the outwardly axially facing annular beveled surface directs lubricant toward the axially facing surface of the first end cap.

5. The turbocharger bearing assembly of claim 1 wherein the outer race surface of the turbine side rolling element bearing comprises an outer race opening having an outer race opening diameter and wherein the axially facing surface of the second end cap comprises an end cap opening having an end cap opening diameter that is less than the outer race opening diameter.

6. The turbocharger bearing assembly of claim 5 wherein the second end cap comprises an outwardly axially facing annular beveled surface disposed about the end cap opening.

7. The turbocharger bearing assembly of claim 1 wherein at least one of the first end cap and the second end cap comprises at least one lubricant channel.

8. The turbocharger bearing assembly of claim 1 wherein at least one of the first end cap and the second end cap comprises a polymeric material.

9. The turbocharger bearing assembly of claim 1 wherein the first end cap comprises a recess and wherein the spring comprises an end feature seated at least partially in the recess of the first end cap.

10. The turbocharger bearing assembly of claim 1 wherein the second end cap comprises a recess and wherein the spring comprises an end feature seated at least partially in the recess of the second end cap.

11. The turbocharger bearing assembly of claim 1 wherein a sum of an annular dimension of the compressor side surface of the spacer and an annular dimension of the axially facing surface of the first end cap exceed an annular dimension of the outer race surface of the compressor side rolling element bearing.

12. The turbocharger bearing assembly of claim 1 wherein a sum of an annular dimension of the turbine side surface of the spacer and an annular dimension of the axially facing surface of the second end cap exceed an annular dimension of the outer race surface of the turbine side rolling element bearing.

13. The turbocharger bearing assembly of claim 1 wherein at least one of the first end cap and the second end cap comprises a cylindrical wall portion and a flange portion.

14. The turbocharger bearing assembly of claim 13 wherein the cylindrical wall portion comprises an inner diameter that receives an outer diameter of the spring.

15. A turbocharger bearing assembly comprising:
a spacer that comprises an axial through bore, a compressor side surface and a turbine side surface;
a compressor side rolling element bearing that comprises an outer race surface that faces the compressor side surface of the spacer;
a turbine side rolling element bearing that comprises an outer race surface that faces the turbine side surface of the spacer; and
a spring seated between a first end cap disposed at least in part in the axial through bore of the spacer and a second end cap disposed at least in part in the axial through bore of the spacer wherein the spring biases an axially facing surface of the first end cap against the outer race surface of the compressor side rolling element bearing, wherein the spring biases an axially facing surface of the second end cap against the outer race surface of the turbine side rolling element bearing, wherein at least one of the first end cap and the second end cap comprises a cylindrical wall portion and a flange portion, and wherein the spring comprises an inner diameter that receives an outer diameter of the cylindrical wall portion.

16. A turbocharger bearing assembly comprising:
a spacer that comprises an axial through bore, a compressor side surface and a turbine side surface;
a compressor side rolling element bearing that comprises an outer race surface that faces the compressor side surface of the spacer;
a turbine side rolling element bearing that comprises an outer race surface that faces the turbine side surface of the spacer; and
a spring seated between a first end cap disposed at least in part in the axial through bore of the spacer and a second end cap disposed at least in part in the axial through bore of the spacer wherein the spring biases an axially facing surface of the first end cap against the outer race surface of the compressor side rolling element bearing, wherein the spring biases an axially facing surface of the second end cap against the outer race surface of the turbine side rolling element bearing and wherein the first end cap and the compressor side rolling element bearing form tiered lubricant drainage bevels and/or the second end cap and the turbine side rolling element bearing form tiered lubricant drainage bevels.

* * * * *